United States Patent [19]

Schaefer

[11] 4,248,343
[45] Feb. 3, 1981

[54] DEVICE AND METHOD FOR PROTECTING BALED HAY FROM MOISTURE

[76] Inventor: Alan W. Schaefer, Rte. 2, St. Genevieve, Mo. 63670

[21] Appl. No.: 74,500

[22] Filed: Sep. 11, 1979

[51] Int. Cl.³ .......................... A45C 3/00; B65D 71/00
[52] U.S. Cl. ................................. 206/83.5; 150/52 R
[58] Field of Search ....................... 206/83.5; 150/52 R

[56] References Cited
U.S. PATENT DOCUMENTS

| | | | |
|---|---|---|---|
| 983,492 | 2/1911 | Harriss | 206/83.5 |
| 2,635,562 | 4/1953 | Abramson | 150/52 R |
| 3,797,650 | 3/1974 | O'Brien et al. | 150/52 R |

Primary Examiner—William T. Dixson, Jr.
Attorney, Agent, or Firm—Gravely, Lieder & Woodruff

[57] ABSTRACT

A device for protecting baled hay from moisture damage includes a cover that fits over the hay bale and fasteners that project into the bale and connect with the cover so as to secure the cover in place. Each fastener has projections which lie in a single plane and when the fastener is turned so that plane is crosswise to parallel stalks of hay in the bale, the fastener remains firmly in place and cannot be easily withdrawn. On the other hand, when the plane of the projections is parallel to the stalks of hay, the fastener is quite easily emplaced or removed.

17 Claims, 7 Drawing Figures

DEVICE AND METHOD FOR PROTECTING BALED HAY FROM MOISTURE

BACKGROUND OF THE INVENTION

This invention relates in general to the protection of fodder, and more particularly to a device and process for covering hay that is gathered into bales to thereby protect the hay from moisture damage.

Most of the hay that is grown and cut in this country is baled for use as fodder during the winter months when cattle have little or no grass upon which to graze. The hay loft of the typical barn was the usual place to store this hay, for the barn protected the hay from the elements, particularly moisture which tends to rot hay. Farm machinery accommodated this end, providing rectangular bales which were easily handled and stacked. Indeed, the typical rectangular hay bale weighed no more than about 50 lbs. and as such could be handled by a single individual and lifted to a hay loft on a conveyor.

Recently, machines have been developed which roll the hay in large cylindrical bales measuring about 6 feet in diameter and weighing as much as 1200 to 1500 lbs. These bales are much too large to store in barns, much less lift into hay lofts. Usually, they are moved with a bale fork from the hay fields to the edges of those fields where they remain available for subsequent use as fodder. Rain and snow penetrate these bales, and over a period of time the hay rots or becomes moldy, particularly immediately beneath the outer layers. Moldy and rotten hay should not be consumed by the cattle since it can have a toxic effect. Thus, toward the end of winter and early spring much of the hay that is stored outdoors is unfit for consumption by the cattle, but this is the time when cows give birth and should have the highest quality fodder.

SUMMARY OF THE INVENTION

One of the principal objects of the present invention is to provide a device and process for protecting hay that is gathered into bales so that the bales can be stored outdoors for extended periods of time with little loss of hay. Another object is to provide a device and process of the type stated which enables a stockman to have good quality hay, even at the end of the winter months. A further object is to provide a device of the type stated which is easy to install on the hay bales and is easily stored when it is not needed. An additional object is to provide a device of the type stated which is capable of being anchored firmly to a hay bale so that it will remain in place even in the presence of heavy winds. Still another object is to provide a device and process of the type stated that are ideally suited for protecting hay gathered into circular bales. Yet another object is to provide a device of the type stated that is simple in construction and inexpensive to manufacture. These and other objects and advantages will become apparent hereinafter.

The present invention is embodied in a combination of a bale of hay and a device for protecting the hay from moisture, the latter including a cover that extends over the bale and fasteners that extend into the bale and connect with the cover to hold the cover in place. The invention further resides in the process for protecting the hay with the cover and fasteners. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
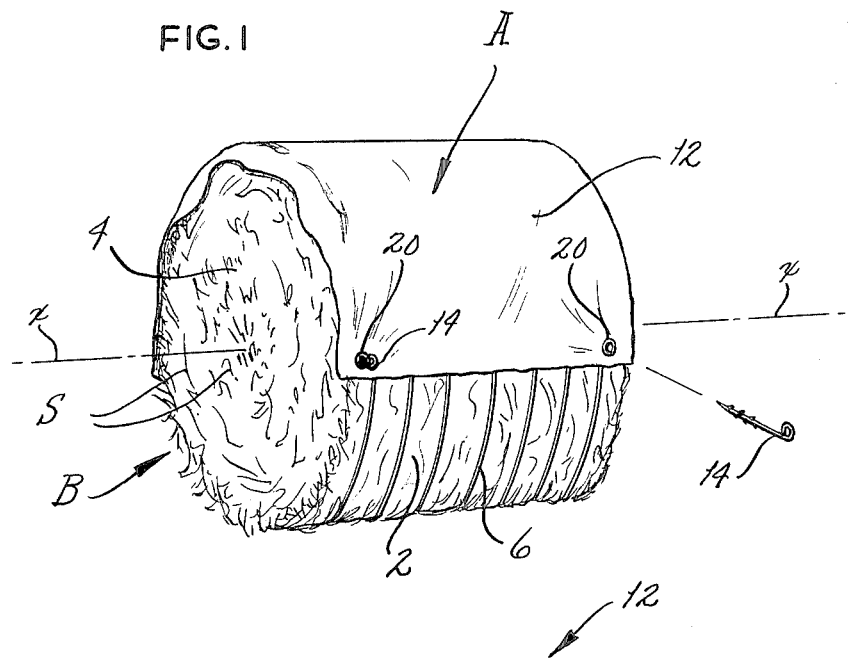
FIG. 1 is a perspective view of a cylindrical bale of hay that is protected from moisture by a protective device constructed in accordance with and embodying the present invention.

Referring now to the drawings, A designates a protective device for a cylindrical bale B of hay which is typical of hay bales produced by certain farm machinery classified in general as large round hay balers. As such the bale B (FIG. 1) has the hay stalks S that comprise it wound into a circular configuration with the stalks S being generally concentric to the axis X of the bale B. Actually the stalks S spiral about the axis X, but the pitch of the spiral is so slight that the stalk S are for all intents and purposes concentric to the axis X. In any event, the resulting bale B has a generally circumferential surface 2 that is concentric to the axis X and generally flat end faces 4 that are perpendicular to the axis X, and the hay of the bale B is held in the cylindrical configuration by binding 6 that extends circumferentially around the circumferential surface 2. The bale B generally measures about 6 feet in diameter and about 5 feet in length, although the diameter may vary in the range of 4 to 6 feet depending on the baler being used, and the bales may weigh between 800 and 1500 pounds. The Bale B rests on the ground with its axis X in a horizontal disposition, and when properly emplaced, the protective device A extends over the upwardly presented portion of circumferential surface 2 for the bale B so as to shed water and snow and thereby protect the hay of the bale B from water damage. In other words, the protective device A keeps moisture out of the bale B for the duration of the winter months, so that when the hay in the bale B is needed for fodder, it is in a condition suitable for that purpose and is not moldy or rotted. The protective device A basically includes a cover 12 that fits over the bale B and a plurality of fasteners 14 that project into the hay and secure the cover 12 firmly to the bale B.

Figure 2:
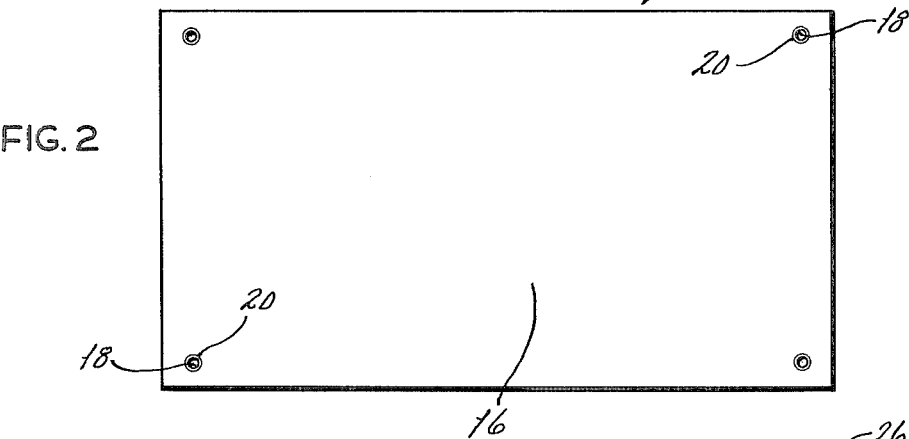
FIG. 2 is a plan view of a cover forming part of the protective device.

The cover 12 consists of a single sheet 16 (FIG. 2) of flexible material that is impervious to water and is large enough to cover the upwardly presented portion of the circumferential surface 2 for the bale B. More specifically, the sheet 16 is rectangular in configuration, it being slightly wider than the length of the bale A and slightly longer than one-half of the circumference for the circumferential surface 2. A sheet 16 measuring 5×9 feet is suitable for the typical bale B. Premium grade plastic sheet about 8 mills thick and containing ultraviolet light inhibitors is an ideal material from which to cut the cover 12, but other materials such as canvas are likewise acceptable. Near each of its corners, the sheet 16 is provided with an aperture 18 and a heavy grommet 20 that is fitted into and secured within the aperture 18. Preferably the apertures 18 are located about 2 inches inwardly from the side and end margins that intersect to form the corners of the cover 12. The grommets 20 may be plastic and should have about a 7/16" inside diameter hole.

When the cover 12 is placed over the bale B (FIG. 1), the side margins of the rectangular sheet 16 extend slightly beyond the end surfaces 4 of the bale B so that the sheet 16 in effect laps over both end faces 4. Moreover, the end margins are disposed slightly below the axis X so that the impervious sheet 16 extends over the entire upwardly presented portion of the circumferential surface 2 on the bale B.

Figure 3:
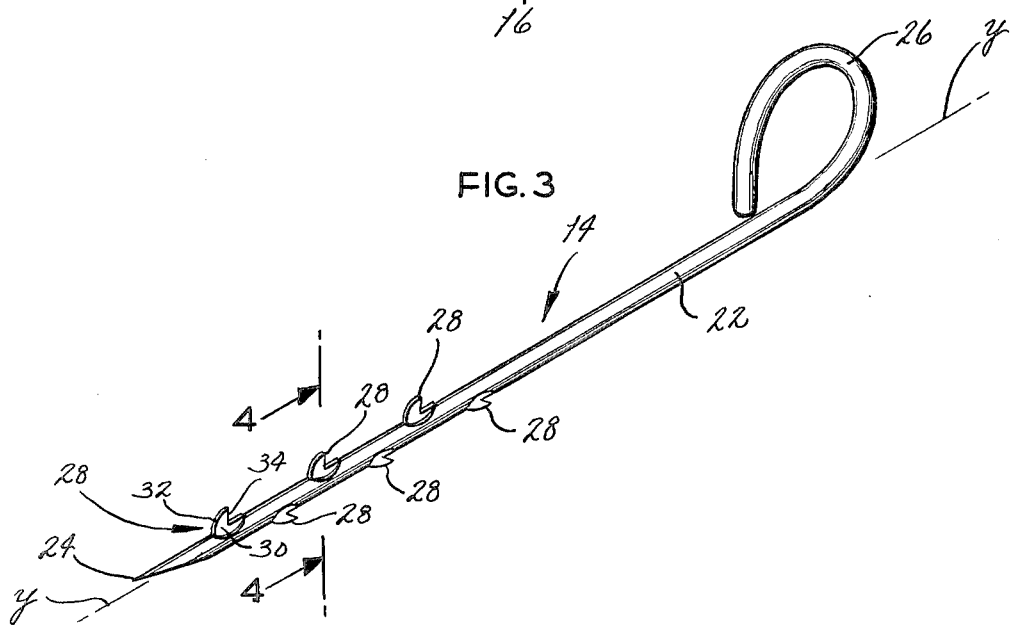
FIG. 3 is a perspective view of a fastener forming part of the protective device.
Figure 4:
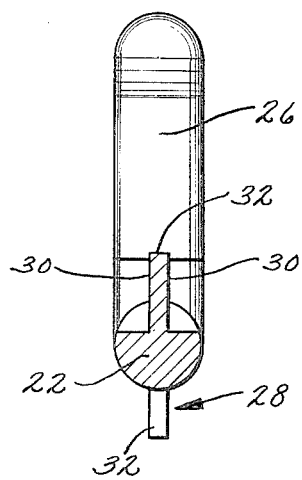
FIG. 4 is a sectional view of the fastener taken along line 4—4 of FIG. 3.

The fasteners 14 fit through the grommets 20 in the sheet 16 and further project into the underlying hay of the bale B so as to secure the cover 12 to the bale B. Each fastener 14 includes (FIGS. 3 & 4) a straight shank 22 that is beveled at its forward end to provide a point 24 and is turned back upon itself at its rear end to form a loop 26 that facilitates gripping the fastener 14 during emplacement and removal. Moreover, the forward portion of the shank 22 is provided with barbs 28 which project outwardly and rearwardly and are arranged in two rows, with the rows being located 180° apart. Each barb 28 is generally flat, having parallel side faces 30 that emerge from the shank 22. Each barb 28 further has a convex leading edge 32 and a straight rear edge 34, the latter being oblique to the axis Y of the shank 22 and directed outwardly and rearwardly. Indeed, the oblique rear edge 34 intersects the curved leading edge to form a point 36. While the barbs 28 in each of the two rows are spaced equal distances apart, the barbs 28 in the one row are offset longitudinally from the barbs 28 in the other row, or in other words, the barbs 28 of the two rows are staggered. The shank 22, even with the barbs 28, is narrow enough to pass through the grommets 20 of the cover 12, but the loop 26 is not. Preferably, the fastener 14 is formed from metal wire stock that is deformed in a suitable die to provide the point 24, the loop 26, and the barbs 28.

OPERATION

To install the protective device A on the bale B so as to prevent significant amounts of moisture from entering the bale B, the cover 12 is first placed over the circumferential surface 2 of the bale B such that it drapes downwardly over the bale with its end edges located slightly below the axis X of the bale (FIG. 1). Moreover, the cover 12 is centered such that its side edges extend slightly beyond the end faces 4 for the bale B, in which case the sides of the cover 12 will drape to a limited measure over those end faces 4.

Figure 5:
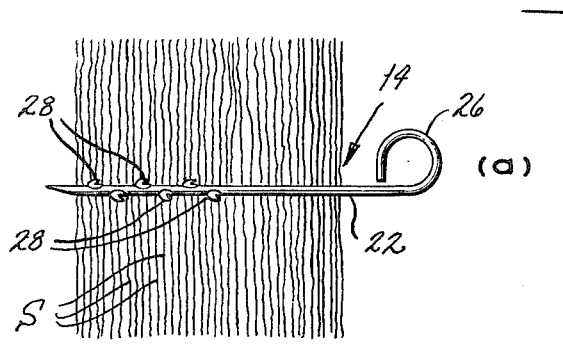
FIG. 5 shows the fastener as it is oriented during its insertion into or removal from the bale.
Figure 6:
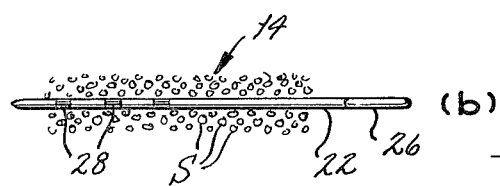
FIG. 6 shows the fastener after it has been twisted to secure it firmly within the bale.
Figure 6:
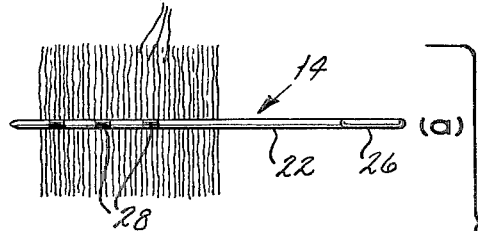

Once the cover 12 is in the proper position, a separate fastener 14 is inserted through each of the grommets 20 and into the underlying hay of the bale B such that the axis Y of the shank 22 for each fastener 14 is generally perpendicular to the axis X of the bale B. Care should be exercised at this time to insure that the plane of the barbs 28 is parallel to the stalks S of hay in the immediate vicinity of the grommet 20 (FIG. 5). This enables the shank 22 of the fastener 14 to pass easily between adjacent stalks S of hay without significantly disturbing those stalks S. However, once the loop 26 comes against the grommet 20, the entire fastener 14 is rotated about 90° merely by twisting it at its loop 26. As a consequence, the barbs 28 project outwardly behind the adjacent stalks S of hay along which the fastener 14 (FIG. 6) lies, thus making it extremely difficult to remove the fastener 14 (FIG. 1). All four fasteners 14 are installed in this manner, and the fasteners 14 remain in that position for as long as the cover 12 is in place.

To remove the cover 12 the four fasteners 14 must first be withdrawn. To remove a fastener 14, one merely grasps the fastener 14 at its loop 26 and turns it 90° so as to again bring the plane of the barbs 28 to a position parallel to the adjacent stalks S between which the shank 22 of the fastener 14 lies. Then the fastener 14 is merely pulled from the bale B, in which case it passes easily outwardly between the adjacent stalks S. All four fasteners 14 are removed in this manner.

MODIFICATIONS

Figure 7:
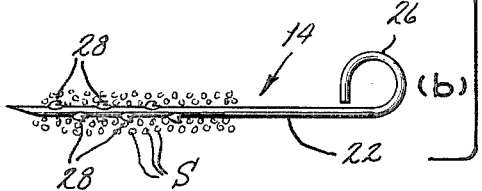
FIG. 7 is a perspective view showing an alternate method of inserting the fastener in the bale for securing the cover.
Figure 7:
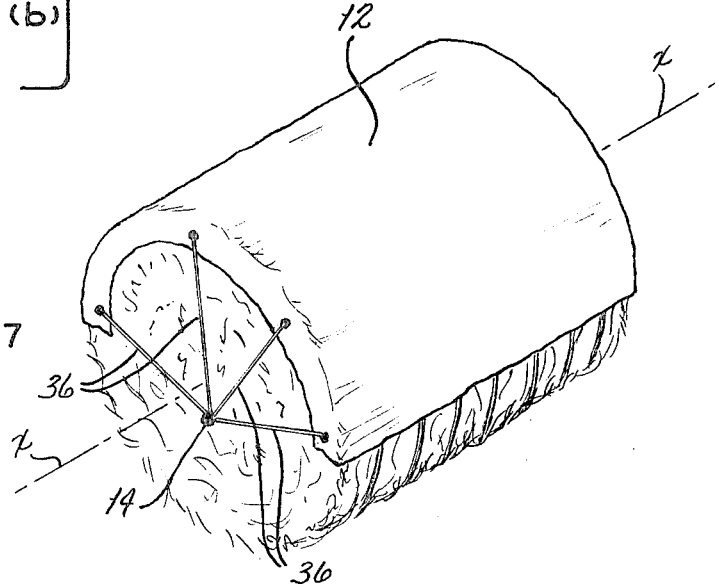

When the cover 12 is secured with fasteners 14 that pass through the grommets 20, a minimum of 4 fasteners are required to secure the cover 12—one at each corner of the cover 12. However, the cover 12 may be secured with merely 2 fasteners, those fasteners being inserted into the bale B at its end faces 4 generally directly below the axis X with their shanks 22 parallel to the axis X (FIG. 7). Again, the plane of the barbs 28 lies generally parallel to the stalks S at the point where the insertion is made, and this of course facilitates entry of the fastener 14 into the bale B. Once the fastener 14 is fully inserted, it is turned 90° such that the loop 26 projects upwardly toward the bale axis X. Thereupon, a rope 36 or some other binding material is extended between the loop 26 at the end of the fastener 14 and the grommets 20 that lie along that end of the bale B into which the fastener 14 is installed. The tension in the rope 36 keeps the loop 26 of the fastener 14 in the correct orientation, that is directed upwardly.

Figure 8:
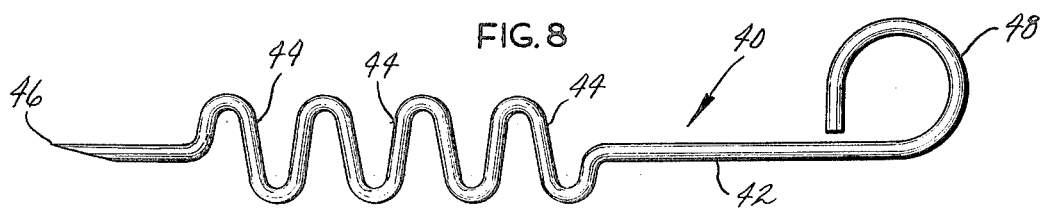
FIG. 8 is an elevational view of a modified fastener.

A modified fastener 40 (FIG. 8) does not have barbs 28 to secure it in place, but instead has a shank 42 that possesses a point 44 at one end and undulations 46 located rearwardly from the point 44. At the other end of the shank 42 is a loop 48. The undulations 46 serve as projections that fit between adjacent stalks s of hay. As a consequence, the undulations lie entirely within a single plane, and the loop 48 at the end of the undulated shank 42 should likewise lie in that plane.

This invention is intended to cover all changes and modifications of the example of the invention herein chosen for purposes of the disclosure which do not constitute departures from the spirit and scope of the invention.

What is claimed is:

1. In combination with a bale of hay having adjacent stalks arranged generally parallel to each other, a device for protecting the hay of the bale from moisture, said device comprising: a cover located over the upwardly presented surface of the bale of hay and being formed from a water-impervious material; and elongated fasteners projected into the hay of the bale and connected with the cover such as to secure the cover in place on the bale.

2. The combination according to claim 1 wherein the cover is provided with apertures and the fastener projects through the apertures in the cover and into the hay of the bale.

3. The combination according to claim 1 wherein each fastener has a longitudinal axis and projections which lie generally in a single plane that passes through the axis, so that the fastener can be inserted with ease into the hay of the bale when the plane of the projections is generally parallel to the stalks of hay, the fastener being positioned within the hay with the plane of the projections generally perpendicular to the stalks of hay, whereby the fastener is not easily withdrawn from the bale of hay.

4. The combination according to claim 3 wherein the fastener includes an enlarged gripping portion at one end.

5. The combination according to claim 4 wherein the fastener has a point at its opposite end.

6. The combination according to claim 4 wherein the cover is provided with apertures and the fasteners for the most part fit through the apertures and into the hay, but the gripping portions of the fasteners are too large to fit through the cover at the apertures.

7. The combination according to claim 3 wherein the fastener includes a straight shank located along the longitudinal axis, and an enlarged gripping portion at one end of the shank, and wherein the projections are barbs which project outwardly from the shank and generally rearwardly toward the gripping portion.

8. The combination according to claim 7 wherein the gripping portion is a loop that lies in the plane of the projections.

9. The combination according to claim 7 wherein the shank has a point on its other end.

10. The combination according to claim 7 wherein the leading edge of each barb is convex and the trailing edge is generally straight and oblique to the longitudinal axis of the shank, the straight trailing edge intersecting the convex leading edge to form a generally rearwardly directed point.

11. The combination according to claim 3 wherein the bale has a generally cylindrical configuration with the stalks being wound generally circumferentially about the axis of the cylindrical configuration.

12. The combination according to claim 1 and further comprising rope connecting the cover to the fasteners.

13. The combination according to claim 12 wherein the bale has a cylindrical configuration with the stalks being wound generally circumferentially around the axis of the cylindrical configuration and the fasteners are projected into the end faces of the cylindrical configuration.

14. A process for protecting a bale of hay having a cylindrical configuration with the axis of the cylindrical configuration being generally horizontal and stalk being wound circumferentially around that axis such that adjacent stalks are parallel, said process comprising: placing a water impervious cover over the upwardly presented surface area of the bale, and inserting elongated fasteners into the bale such that the fasteners are connected with the cover and hold the cover in place.

15. A process according to claim 14 wherein the fasteners are inserted through the cover and into the bale of hay.

16. A process according to claim 15 wherein each fastener has a longitudinal axis and projections which extend away from that axis and behind stalks of hay so as to resist easy removal of the fastener.

17. A process according to claim 16 wherein the projections extend in two directions away from the longitudinal axis and lie in a single plane that passes through the axis, the plane being generally crosswise with respect to the parallel stalks of hay between which the fastener fits.

* * * * *